(12) United States Patent
Leshem et al.

(10) Patent No.: US 12,592,879 B2
(45) Date of Patent: Mar. 31, 2026

(54) CONVERGED FORWARDING TABLE

(71) Applicant: MELLANOX TECHNOLOGIES, LTD., Yokneam (IL)

(72) Inventors: Roee Levy Leshem, Tel-Aviv (IL); Lior Hodaya Bezen, Tel-Aviv (IL); Alex Netes, Rehovot (IL); Lion Levi, Yavne (IL); Itamar Rabenstein, Petach-Tiqwa (IL); Uriel Vanunu, Tel Aviv (IL); Inbal Gal, Ramat Gan (IL); Michael Avimelech Gandelman Milgrom, Aventura, FL (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 334 days.

(21) Appl. No.: 18/116,115

(22) Filed: Mar. 1, 2023

(65) Prior Publication Data

US 2024/0297843 A1 Sep. 5, 2024

(51) Int. Cl.
H04L 45/24 (2022.01)
H04L 45/021 (2022.01)
H04L 45/42 (2022.01)

(52) U.S. Cl.
CPC ............ H04L 45/24 (2013.01); H04L 45/021 (2013.01); H04L 45/42 (2013.01)

(58) Field of Classification Search
CPC .... H04L 12/4633; H04L 45/66; H04L 49/111; H04L 45/7453; H04L 45/12; H04L 61/2585; H04L 45/245
See application file for complete search history.

(56) References Cited

U.S. PATENT DOCUMENTS

| | | | |
|---|---|---|---|
| 9,787,567 B1 * | 10/2017 | Mehta | H04L 43/06 |
| 10,469,382 B2 * | 11/2019 | Yerushalmi | H04L 45/586 |
| 11,070,472 B1 * | 7/2021 | Maharia | H04L 45/7453 |
| 12,250,148 B1 * | 3/2025 | Flamini | H04L 45/745 |
| 2014/0198638 A1 * | 7/2014 | Campbell | H04L 47/12 370/235 |
| 2014/0280488 A1 * | 9/2014 | Voit | H04L 41/0895 709/203 |
| 2015/0089058 A1 * | 3/2015 | Hu | H04L 41/0894 709/225 |
| 2015/0124826 A1 * | 5/2015 | Edsall | H04L 45/66 370/392 |
| 2015/0381492 A1 * | 12/2015 | Kamble | H04L 49/354 370/392 |
| 2017/0126549 A1 * | 5/2017 | Paramasivam | H04L 47/624 |
| 2018/0176128 A1 * | 6/2018 | Sharma | H04L 41/0886 |
| 2022/0224684 A1 * | 7/2022 | Schultz | H04W 76/11 |
| 2024/0179089 A1 * | 5/2024 | Cirkovic | H04L 45/748 |

* cited by examiner

*Primary Examiner* — Mahran Y Abu Roumi
(74) *Attorney, Agent, or Firm* — Sheridan Ross P.C.

(57) ABSTRACT

A network device, system, and method are provided. In one example, a system is described that includes a plurality of communication nodes and a network device that interconnects and facilitates a transmission of packets between the plurality of communication nodes. The system may be configured such that the packets are transmitted between the plurality of communication nodes by applying a filter to a converged forwarding table.

20 Claims, 6 Drawing Sheets

| INGRESS PORT | EGRESS PORTS | VECTOR |
|---|---|---|
| 1 | 13 | 1 |
| 1 | 14 | 1 |
| 1 | 15 | 1 |
| 2 | | |
| 3 | | |
| 4 | | |
| 5 | | |
| 6 | | |
| 7 | | |
| 8 | | |
| 9 | | |
| 10 | | |
| 11 | | |
| 12 | | |

| RAIL | INGRESS PORT | EGRESS PORTS |
|------|--------------|--------------|
| 251 | 1 | 13-15 |
| 251 | 2 | 13-15 |
| 251 | 3 | 13-15 |
| 252 | 4 | 16-18 |
| 252 | 5 | 16-18 |
| 252 | 6 | 16-18 |
| 253 | 7 | 19-21 |
| 253 | 8 | 19-21 |
| 253 | 9 | 19-21 |
| 254 | 10 | 22-24 |
| 254 | 11 | 22-24 |
| 254 | 12 | 22-24 |

400

| INGRESS PORT | EGRESS PORTS | VECTOR |
|---|---|---|
| 1 | 13 | 1 |
| 1 | 14 | 1 |
| 1 | 15 | 1 |
| 2 | 13-15 | 0 |
| 3 | 13-15 | 0 |
| 4 | 16-18 | 0 |
| 5 | 16-18 | 0 |
| 6 | 16-18 | 0 |
| 7 | 19-21 | 0 |
| 8 | 19-21 | 0 |
| 9 | 19-21 | 0 |
| 10 | 22-24 | 0 |
| 11 | 22-24 | 0 |
| 12 | 22-24 | 0 |

460a

500

Generate converged forwarding table for rail-optimized network device — 504

Receive packet for forwarding — 508

Apply filter — 512

Select egress port for forwarding — 516

Forward traffic — 520

Generate converged forwarding table for rail-optimized network device ⟋ 504b

Receive packet for forwarding ⟋ 508b

Apply filter ⟋ 512b

Select all remaining egress ports for multicast forwarding ⟋ 516b

Multicast traffic on selected egress ports ⟋ 520b

CONVERGED FORWARDING TABLE

FIELD OF THE DISCLOSURE

The present disclosure is generally directed toward networking and, in particular, toward networking devices, switches, and methods of operating the same.

BACKGROUND

Switches and similar network devices represent a core component of many communication, security, and computing networks. Switches are often used to connect multiple devices, device types, networks, and network types. Forwarding tables map ingress ports to egress ports, and are used to select the appropriate egress port for forwarding a packet out of a switch.

BRIEF SUMMARY

Network topology describes the arrangement of the network elements (links, nodes, etc.) of a communication network. Network topology is the structure of a network and may be depicted physically or logically. Physical topology is the placement of the various components of a network (e.g., device location and cable installation), while logical topology illustrates how data flows within a network. Logically, a network may be separated into separate parallel rails, which allows support of larger scale networks at low latency. The number of rails may vary and depends on the topology structure of a network and the number of connected devices.

Throughout the instant description, a switch integrated circuit (IC) should generally be understood to comprise switching hardware, such as an application specific integrated circuit (ASIC) that has switching capabilities. Multiplane network devices and non-multiplane network devices used in multiplane networks described herein may each include a single switch IC or multiple switch ICs.

Inventive concepts relate to network devices for a multiplane network (also called a planarized network or planarization or the like). A multiplane network may be implemented by dividing the switching fabric of a traditional communication network into multiple planes. For example, a related art, non-multiplane network device for High Performance Computing (HPC) systems may include a single high-bandwidth switch IC that is managed on a per-switch IC basis along with other high-bandwidth switches in the same network device or in other network devices of the switching fabric.

A multiplane network device according to inventive concepts, however, is a network device having multiple smaller-bandwidth switch ICs that, when taken collectively, have an aggregated bandwidth equal to the single high-bandwidth switch IC of the related art. In addition, the multiple smaller bandwidth switch ICs of a multiplane network device may not be visible to the user (e.g., the multiple switch ICs are not exposed to an application programming interface (API) that enables user interaction with the network so that applications can use the network without being aware of the planes). Stated another way, the system is constructed such that applications perceive the multiple smaller bandwidth switch ICs of a multiplane network device as a single, larger bandwidth switch IC.

A spine-leaf architecture is network topology that consists of two switching layers-a spine and leaf. The leaf layer consists of access switches that aggregate traffic from servers and connect directly into the spine or network core. Spine switches interconnect all leaf switches in a full-mesh topology.

In rail-optimized networks, each port may have a private forwarding table that maps a group of ports to a single rail and enforces forwarding in each rail without rail crossing. However, each port needs to be configured with its own private forwarding table, so for a switch with twenty-four ports, a separate configuration packet is sent to each port (e.g., one packet per port). Therefore, in order to save configuration time and management control bandwidth in the network, a subnet manager (SM) may instead configure the same forwarding table values in all ports (e.g., a converged forwarding table). However, a converged forwarding table will be larger than a private forwarding table per port, and so lookup times in the converged forwarding table would increase compared to a private forwarding table per port.

In order to decrease lookup time when using a converged forwarding table, one or more filters may be applied to the converged forwarding table prior to making a forwarding decision. A filter is a single static mask of egress ports per ingress port. The forwarding decision is made after applying the filter on the converged forwarding table. In other words, egress ports that belong to a different rail than the ingress port are masked, reducing the number of entries that must be searched. In a rail-optimized network, the filter may be configured according to the port rail assignment. The filter allows having a single converged forwarding table for all ports. In other words, instead of keeping a different forwarding table per port, the present disclosure utilizes a converged forwarding table per switch and a filter per port. Each filter causes only egress ports belonging to the same rail as the ingress port to be "visible" therefore, the converged forwarding table becomes much smaller and quicker to search. The forwarding table may be applied to either Unicast (UC) or Multicast (MC).

Embodiments of the present disclosure aim to solve the above-noted shortcomings and other issues by implementing an improved routing approach. The routing approach depicted and described herein may be applied to a switch, a router, or any other suitable type of networking device known or yet to be developed. As will be described in further detail herein, a switch that implements the converged forwarding table and filter approaches described herein may correspond to an optical routing switch (e.g., an Optical Circuit Switch (OCS)), an electrical switch, a combined electro-optical switch, or the like.

The routing approach provided herein may utilize a converged forwarding table for more efficient configuration, without sacrificing lookup speed by applying filters to the converged table based on the port.

In an illustrative example, a network device is disclosed that includes: a plurality of ports, each port in the plurality of ports for routing traffic to an endpoint, wherein each port in the plurality of ports corresponds to a rail in a rail-optimized network; and a forwarding table that includes entries for the plurality of ports in the network device, wherein a filter associated with an ingress port is applied to the forwarding table before a forwarding decision is made.

In another example, a system is disclosed that includes: a plurality of ports for routing the data traffic to an endpoint, wherein each port in the plurality of ports corresponds to a rail in a rail-optimized network; and a forwarding table, wherein the forwarding table includes entries for the plurality of ports in a network device, and wherein a filter associated with an ingress port is applied to the forwarding table before a forwarding decision is made.

In yet another example, a method of routing data traffic is disclosed that includes: generating a forwarding table that maps an ingress port to one or more egress ports, wherein the forwarding table includes entries for a plurality of ports of a network device, and wherein each port in the plurality of ports corresponds to a rail in a rail-optimized network; receiving, via a first ingress port, a packet for forwarding; applying a filter associated with the first ingress port to the forwarding table before selecting an egress port for forwarding the received packet; selecting, based on applying the filter, the egress port for forwarding the received packet; and forwarding the received packet via the selected egress port. Any of the above example aspects include wherein the forwarding table is segmented into a first range of addresses accessible by a specific port, and a second range of addresses shared by a plurality of ports.

In another example, a method of routing data traffic is disclosed that includes: generating a forwarding table that maps an ingress port to one or more egress ports, wherein the forwarding table includes entries for a plurality of ports of a network device, and wherein each port in the plurality of ports corresponds to a rail in a rail-optimized network; receiving, via a first ingress port, a packet for forwarding; applying a filter associated with the first ingress port to the forwarding table before selecting at least one egress port for forwarding the received packet; selecting, based on applying the filter, the at least one egress port for forwarding the received packet; and forwarding the received packet via the at least one selected egress port.

Any of the above example aspects include broadcast via Unicast (UC) or Multicast (MC).

Any of the above example aspects include receiving, via an ingress port, a packet for forwarding; applying a filter associated with the ingress port to the forwarding table before selecting an egress port for forwarding the received packet; selecting, based on applying the filter, the egress port for forwarding the received packet; and forwarding the received packet via the selected egress port.

Any of the above example aspects include wherein the filter comprises a static mask of egress ports to an ingress port.

Any of the above example aspects include wherein the filter is configured according to port rail assignments.

Any of the above example aspects include wherein the filter masks egress ports associated with a different rail than a rail associated with the ingress port.

Any of the above example aspects include wherein the switching hardware comprises optical communication components, and wherein the packets are transmitted across the switching hardware using an optical signal.

Any of the above example aspects include wherein the switching hardware comprises electrical communication components, and wherein the packets are transmitted across the switching hardware using an electrical signal.

Any of the above example aspects include wherein each port in the network device has an associated filter.

Any of the above example aspects include wherein the plurality of ports are implemented as a leaf switch.

Any of the above example aspects include wherein the plurality of ports are implemented as a spinal switch.

Any of the above example aspects include wherein a group of ports in the plurality of ports is assigned to each rail in the rail-optimized network.

Any of the above example aspects include wherein the system and method described herein may be applied in any network comprising two or more rails.

Any of the above example aspects include wherein the rail-optimized network comprises at least two rails.

Any of the above example aspects include wherein the rail-optimized network comprises at least four rails.

Any of the above example aspects include wherein the filter masks egress ports that are unavailable based on rail assignments.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
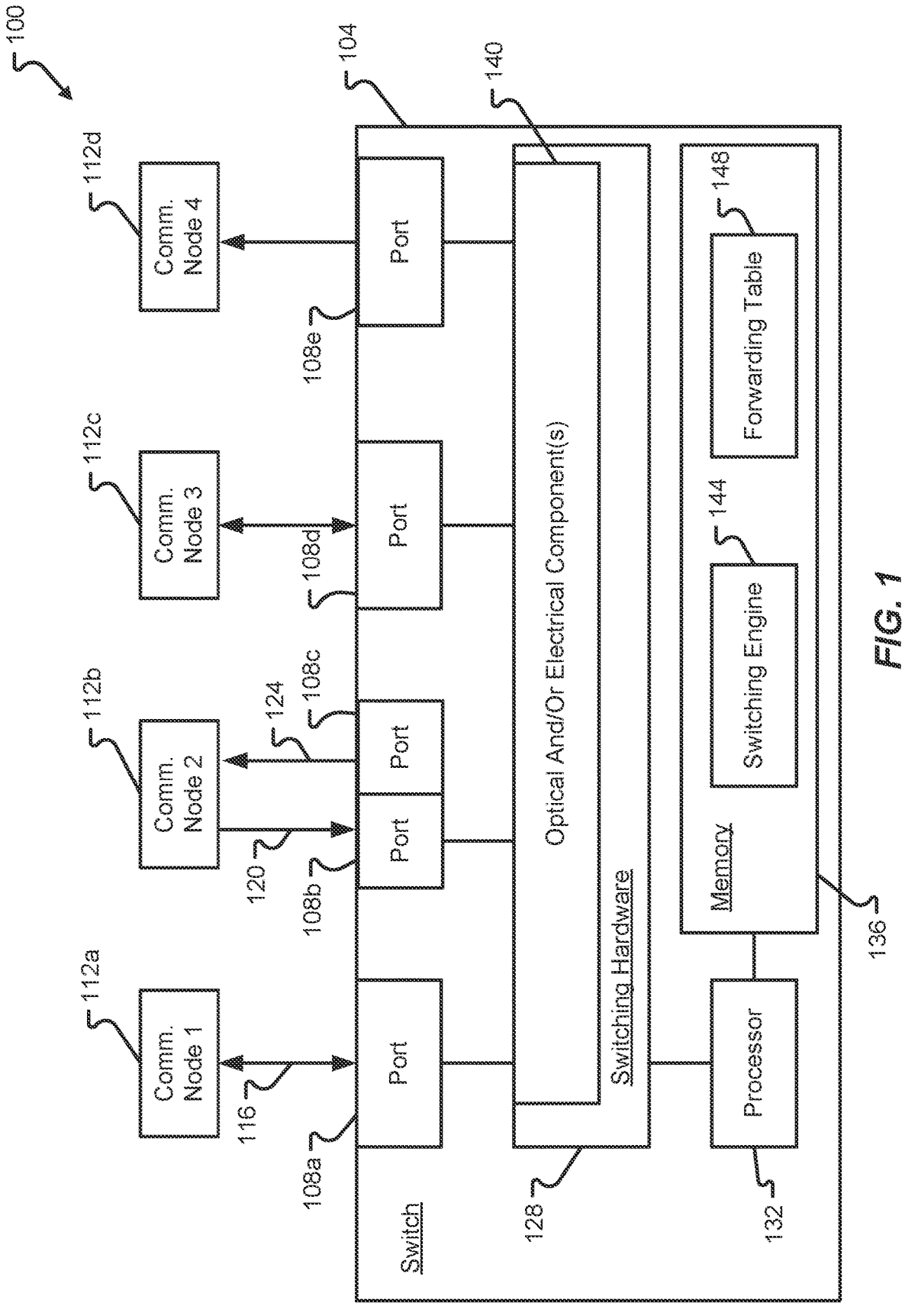
FIG. 1 is a block diagram depicting an illustrative configuration of a switch in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wires, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-5B, various systems and methods for routing packets between communication nodes will be described. The concepts of packet routing depicted and described herein can be applied to the routing of information from one computing device to another. The term packet as used herein should be construed to mean any suitable discrete amount of digitized information. The information being routed may be in the form of a single packet or multiple packets without departing from the scope of the present disclosure. Furthermore, certain embodiments will be described in connection with a system that is configured to make centralized routing decisions, whereas other embodiments will be described in connection with a system that is configured to make distributed and possibly uncoordinated routing decisions. It should be appreciated that the features and functions of a centralized architecture may be applied or used in a distributed architecture or vice versa.

Figure 2:
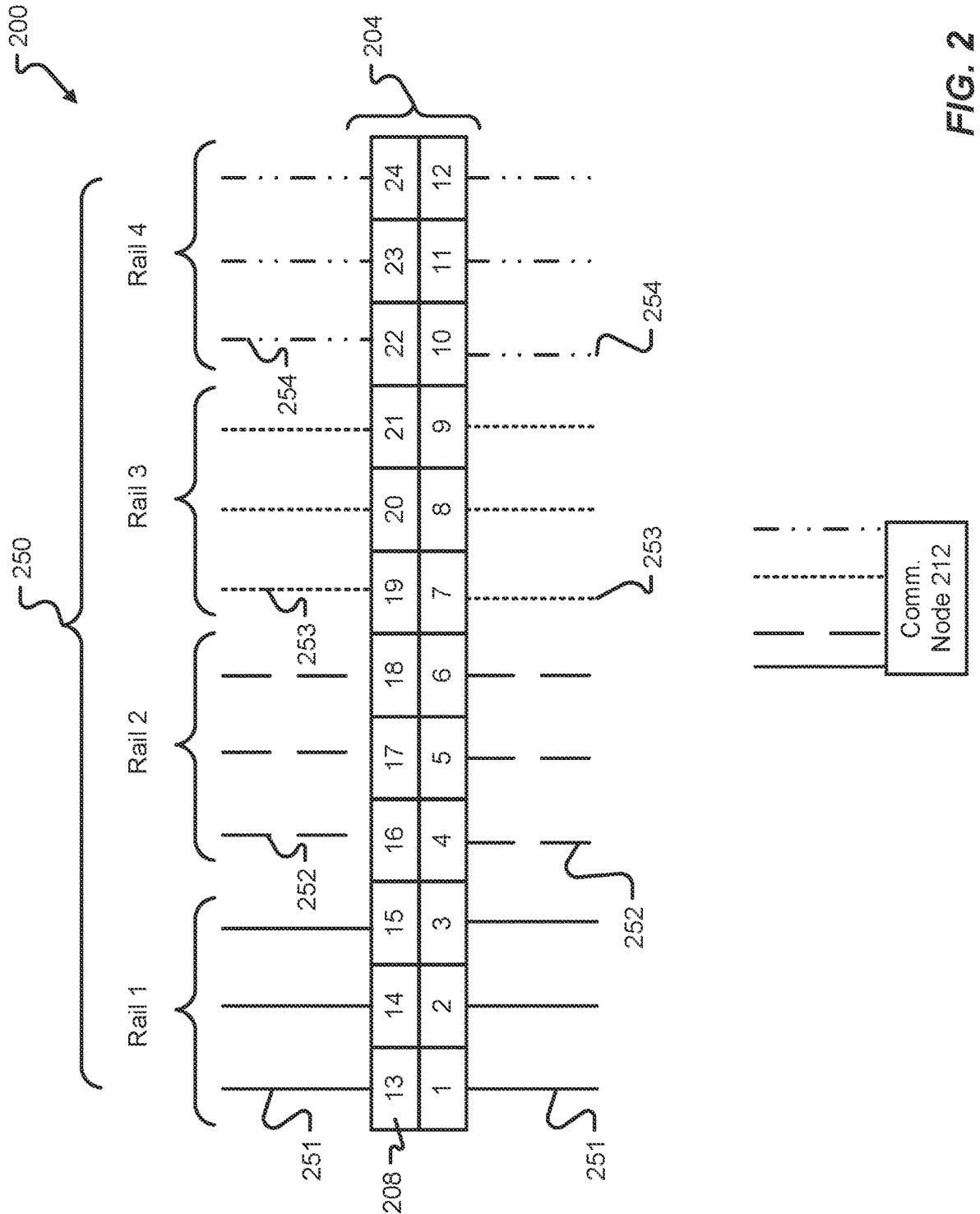
FIG. 2 illustrates a diagram depicting a rail-optimized network in accordance with at least some embodiments of the present disclosure.

Referring to FIG. 1, a possible configuration of a communication system 100 will be described in accordance with at least some embodiments of the present disclosure. It should be appreciated that the components described with reference to FIG. 1 may or may not also be used in a device 200 as shown in FIG. 2.

In the configuration of FIG. 1, a communication system 100 is shown to include a switch 104 connecting one or more communication nodes 112 via a number of communication ports 108. The illustrated switch 104 is shown to be connected with four communication nodes 112a-d via a plurality of communication ports 108. The illustration of four communication nodes 112a-d is for ease of discussion and should not be construed as limiting embodiments of the present disclosure. Specifically, a switch 104 may be configured to connect any suitable number of communication nodes 112 and the switch 104 may include a number of ports 108 to facilitate such connections. Even more specifically, a switch 104 may be configured to connect a greater or lesser number of communication nodes 112 than are shown in FIG. 1. Moreover, embodiments of the present disclosure contemplate that not all ports 108 of a switch 104 need to be connected with a communication node 112. For instance, one or more ports 108 of a switch 104 may be left unconnected (e.g., open) and may not have any particular networking cable 116 plugged into the port 108.

The communication nodes 112a-d may be the same type of devices or different types of devices. As a non-limiting example, some or all of the communication nodes 112a-d may correspond to a Top-of-Rack (TOR) switch. Alternatively or additionally, one or more of the communication nodes 112a-d may correspond to a device other than a TOR switch. The communication nodes 112a-d do not necessarily need to communicate using the same communication protocol because the switch 104 may include components to facilitate protocol conversion and/or a communication node 112 may be connected to the switch 104 via a pluggable network adapter.

While the communication nodes 112a-d may correspond to a TOR switch, one or more of the communication nodes 112a-d may be considered host devices, servers, network appliances, data storage devices, or combinations thereof. A communication node 112, in some embodiments, may correspond to one or more of a Personal Computer (PC), a laptop, a tablet, a smartphone, a server, a collection of servers, or the like. It should be appreciated that a communication node 112 may be referred to as a host, which may include a network host, an Ethernet host, an InfiniBand (IB) host, NVLink host, etc.

As another specific but non-limiting example, one or more of the communication nodes 112 may correspond to a server offering information resources, services and/or applications to user devices, client devices, or other hosts in the communication system 100. It should be appreciated that the communication nodes 112 may be assigned at least one network address (e.g., an IP address) and the format of the network address assigned thereto may depend upon the nature of the network to which the communication node 112 is connected.

FIG. 1 illustrates that one or multiple networking cables may be used to connect a communication node 112 to the switch 104. In some embodiments, a communication node 112 (e.g., the first communication node 112a, the third communication node 112c, and the fourth communication node 112d) may connect to a single port 108 (e.g., the port 108a, the port 108d, and the port 108e, respectfully) via a bidirectional communication link 116. The bidirectional communication link 116 may be established over a networking cable and may utilize any suitable communication protocol known or yet to be developed for the transmission of data packets.

A communication node 112 (e.g., the second communication node 112b) may alternatively, or additionally, be connected with the switch 104 via multiple ports 108 (e.g., the port 108b, the port 108c). In such a configuration, one of the ports 108 may be used to carry packets from the switch 104 to the communication node 112, whereas the other of the ports 108 may be used to carry packets from the communication node 112 to the switch 104. As an example, the port 108*b* is shown to receive packets from the second communication node 112*b* via a data uplink 120, whereas the port 108*c* is shown to carry packets from the switch 104 to the second communication node 112*b* via a data downlink 124. In this configuration, separate networking cables may be used for the data uplink 120 and the data downlink 124.

The switch 104 may correspond to an optical switch and/or electrical switch. In some embodiments, the switch 104 may include switching hardware 128 that is configurable to selectively interconnect the plurality of ports 108*a-e*, thereby enabling communications between the plurality of ports 108*a-e*, which enables communications between the communication nodes 112*a-d*.

In some embodiments, the switching hardware 128 may be configured to selectively enable the plurality of communication nodes 112*a-d* to communicate in pairs based on a particular configuration of the switching hardware 128. Specifically, the switching hardware 128 may include optical and/or electrical component(s) 140 that are switchable between different matching configurations. In some embodiments, the optical and/or electrical components 140 may be limited in the number of matching configurations it can accommodate, meaning that a port 108 may not necessarily be connected with/matched with every other port 108 at a particular instance in time.

In some embodiments, the switch 104 may correspond to an optical circuit switch, which means that the optical and/or electrical components 140 may include a number of optical and/or opto-electronic components that switch optical signals from one channel to another. The optical and/or electrical components 140 may be configured to provide an optical switching fabric, in some embodiments. As an example, the optical and/or electrical component(s) 140 may be configured to operate by mechanically shifting or moving an optical fiber to drive one or more alternative fibers. Alternatively or additionally, the optical and/or electrical component(s) 140 may include components that facilitate switching between different port matchings by imparting electro-optic effects, magneto-optic effects, or the like. For instance, micromirrors, piezoelectric beam steering mechanisms, liquid crystals, filters, and the like may be provided in the optical and/or electrical components 140 to facilitate switching between different matching configurations of optical channels.

In some embodiments, the switch 104 may correspond to an electrical switch, which means that the optical and/or electrical components 140 may include a number of electrical components or traditional electronic circuitry that is configured to manage packet flows and packet transmissions. Accordingly, the optical and/or electrical components 140 may alternatively or additionally include one or more Integrated Circuit (IC) chips, microprocessors, circuit boards, Data Processing Units (DPUs), simple analog circuit components (e.g., resistors, capacitors, inductors, etc.), digital circuit components (e.g., transistors, logic gates, etc.), memory devices, Field Programmable Gate Arrays (FPGAs), Application Specific Integrated Circuits (ASICs), combinations thereof, and the like.

The switch 104 may correspond to an optical switch and/or electrical switch. In some embodiments, the switch 104 may include switching hardware 128 that is configurable to selectively interconnect the plurality of ports 108*a-d*, thereby enabling communications between the plurality of ports 108*a-d*, which enables communications between the communication nodes 112*a-d*.

In some embodiments, the switch 104 may include a processor 132 that executes the switching engine 144, which is stored in memory 136. The converged forwarding table 148 may also be stored in memory 136 and may be referenced by the processor 132 when executing the switching engine 144.

Although not depicted, a communication node 112 may include a processor 132 and memory 136 as shown in the switch 104 of FIG. 1. The communication nodes 112*a-d* are not shown with a processor 132 and memory 136 for ease of discussion and clarity of the drawings, but this should not be construed as limiting embodiments of the present disclosure.

The processor 132 (whether provided in the switch 104 or a communication node 112) may be configured to execute the instructions (e.g., the switching engine 144) stored in memory 136. As some non-limiting examples, the processor 132 may correspond to a microprocessor, an IC chip, a Central Processing Unit (CPU), a Graphics Processing Unit (GPU), a DPU, or the like. The memory 136 may correspond to any appropriate type of memory device or collection of memory devices configured to store instructions. Non-limiting examples of suitable memory devices that may be used for memory 136 include Flash memory, Random Access Memory (RAM), Read Only Memory (ROM), variants thereof, combinations thereof, or the like. In some embodiments, the memory 136 and processor 132 may be integrated into a common device (e.g., a microprocessor may include integrated memory).

FIG. 2 illustrates a network device 204 that may be used in a rail-optimized network. Communication node 212 communicates with other nodes in a network via the network device 204. Communication node 212 may communicate via multiple rails, as illustrated, or fewer than all the rails. As illustrated, the network device 204 includes ports 208 (e.g., ports 1-24). The ports 208 on the bottom are ingress ports (e.g., ports 1-12), and the ports 208 on the top are egress ports (e.g., ports 13-24). Each ingress port is associated with a rail (e.g., rails 251-254). When a packet is received at an ingress port 208, an egress port 208 is selected based on the rail associated with the ingress port that packet arrived on. Communication node 112 may communicate over all rails 251-254 or over a subset of the rails 251-254.

In other words, each port (ingress or egress) is associated with a single rail. A network may have R rails where $1 \leq R \leq N$, wherein N=the number of ports in a network device. In embodiments, the network device will have at least one ingress port and one egress port. In embodiments, each rail may have multiple ports. The number of ingress ports per rail may be the same as the number of egress ports per rail; however, this is not required. When a packet arrives on a port belonging to a rail r1, the packet exits on one or more egress ports that belong to rail r1.

In other words, when a packet arrives with an address (e.g., a local identifier (LID)), the system accesses the converged forwarding table to retrieve a list of all valid ports that can be used to transmit the packet out of the switch to its destination (e.g., egress ports belonging to the same rail). The converged forwarding table contains all ports from all rails (R), the filter removes (e.g., masks) the egress ports that do not belong to the same rail (R) associated with the ingress port that a packet was received on. Therefore, after the filter is applied, the converged forwarding table shows egress ports that belong to the same rail as the ingress port, and an egress port is selected from those egress ports to pass the packet to. Although FIG. 2 illustrates that each port is associated with a single rail, the present disclosure is not limited to this embodiment. In embodiments, each port may be associated with multiple rails.

For example, if a packet is received on port 1, then egress ports 13-15 are available for forwarding the packet. In another example, if a packet is received on port 12, egress ports 22-24 are available to forward the received packet. The number of ports/rails illustrated are for ease of discussion and clarity of the drawings, but this should not be construed as limiting embodiments of the present disclosure The number of rails may vary and depends on the topology structure of a network and the number of connected devices.

Figure 3:
FIG. 3 illustrates a portion of an example converged forwarding table in accordance with embodiments of the present disclosure.

FIG. 3 illustrates a portion of an example converged forwarding table 300. For example, the forwarding table 300 may be implemented in a network device (e.g., the switch 104/204). The converged forwarding table 300 includes columns rail, ingress port, and egress port. The rail column indicates the rail associated with the port (which may be referred to as a plane, pipe, etc.). The ingress port column indicates the port number in the network device. The egress port column indicates which egress port should be used based on rail assignments. The vector column (not illustrated) may use a "0" to indicate the port is not available and a "1" to indicate the port is available.

Therefore, instead of each port having a private forwarding table that maps a group of ports to a single rail and enforces forwarding in each rail without rail crossing, each port is configured with the same converged forwarding table 300 that has entries for all ports.

In order to decrease lookup time when using the converged forwarding table 300, filters may be applied to the converged forwarding table prior to making a forwarding decision. A filter is a single static mask of egress ports per ingress port. The forwarding decision is made after applying the filter mask on converged forwarding table 300. In other words, egress ports belonging to a different rail than the ingress port are masked, reducing the number of entries that must be searched. In a rail-optimized network, the filter may be configured according to the port rail assignment.

Figure 4:
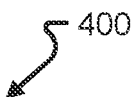
FIG. 4 illustrates an example converged forwarding table with a filter applied in accordance with embodiments of the present disclosure.

With reference now to FIG. 4, an example of a converged forwarding table with a filter applied is illustrated.

In the example illustrated in FIG. 4, when a packet is received on ingress port 1, a filter 460a is applied to the converged forwarding table 400. The filter 460a is applied based on the port and/or rail associated with the packet. After the filter 460a is applied to the converged forwarding table 400, an egress port is selected from the remaining "visible" ports (e.g., ports 13-15). Once the ports belonging to other rails are "filtered out," the egress port may be further selected from the remaining available ports based on other network factors (e.g., load balancing, bandwidth, etc.). For multicast messages, all the "visible" egress ports are selected. The filter may be implemented as a vector field/column, where "0" indicates the port is unavailable, and "1" indicates the port is available.

Figure 5A:
FIG. 5A is a flow diagram depicting a method of routing data traffic in accordance with at least some embodiments of the present disclosure.
Figure 5A:
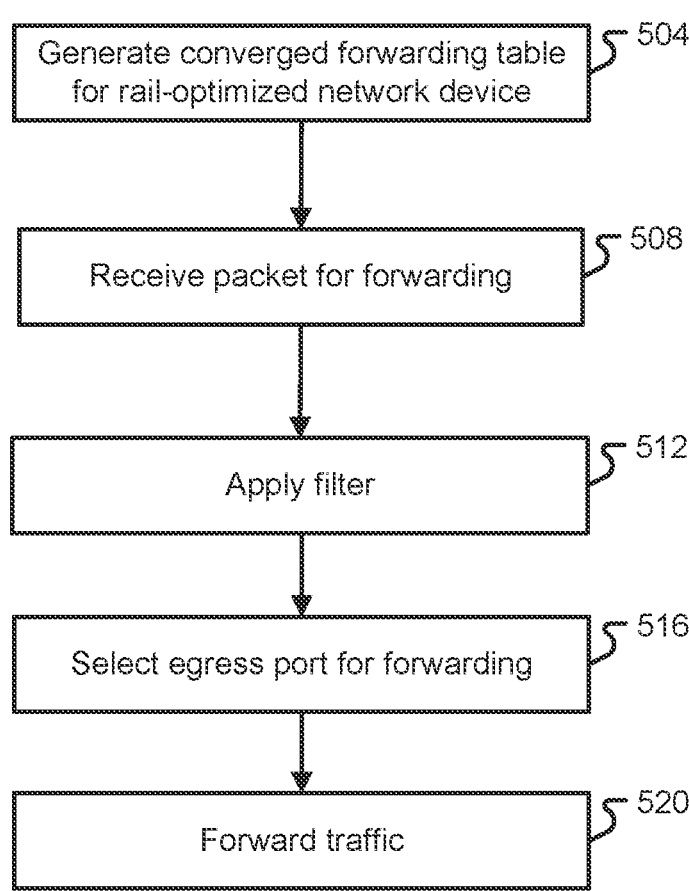

Referring now to FIG. 5A, an illustrative method 500 will be described in accordance with at least some embodiments of the present disclosure. The method 500 may be performed in a switch 104 by a processor 132 implementing a switching engine 144. Alternatively, or additionally, the method 500 may be performed in one or multiple communication nodes 112 by a processor 132 implementing a switching engine 144.

The order of operations depicted in FIG. 5A should not be construed as limiting embodiments of the present disclosure. For instance, certain steps may be performed in a different order without departing from the scope of the present disclosure. Furthermore, some steps may be performed in parallel (e.g., simultaneously) with one another.

The method 500 begins by generating a converged forwarding table (e.g., forwarding table 300) for a rail-optimized network (step 504). For example, a plurality of communication nodes may be connected to a network device via one or more ports of the network device. Furthermore, each port may be assigned to a rail of multiple rails. Although four rails 251-254 are illustrated in FIG. 2, each network device may include fewer or more rails. Additionally, or alternatively, the number of pipes on each network device may not be the same.

The method 500 may continue by receiving a packet for forwarding (step 508). The method 500 may further include applying a filter to the converged forwarding table (e.g., forwarding table 300) based on the rail a received packet is associated with (step 512). In some embodiments, the converged forwarding table may be maintained in memory at the switch 104. The filter masks egress ports that do not belong to the same rail as the rail associated with the received packet. The method 500 may further include selecting an egress port for forwarding (step 516). For example, a packet may be received at port 1 of the switch 104/204 and port 1 belongs to rail 2. The filter masks all egress ports not associated with rail 2 and an egress port is selected from the remaining ports. The packet is forwarded on the selected egress port (step 520).

Figure 5B:
FIG. 5B is a flow diagram depicting a method of multicasting traffic in accordance with at least some embodiments of the present disclosure.
Figure 5B:
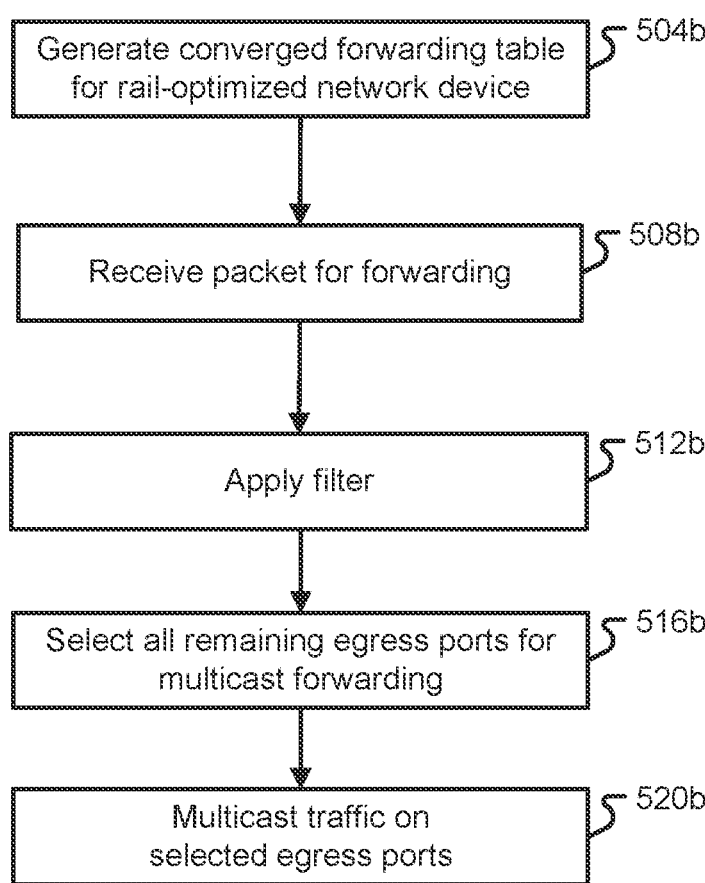

Referring now to FIG. 5B, an illustrative method 500b will be described in accordance with at least some embodiments of the present disclosure. The method 500b may be performed in a switch 104 by a processor 132 implementing a switching engine 144. Alternatively, or additionally, the method 500b may be performed in one or multiple communication nodes 112 by a processor 132 implementing a switching engine 144.

The order of operations depicted in FIG. 5B should not be construed as limiting embodiments of the present disclosure. For instance, certain steps may be performed in a different order without departing from the scope of the present disclosure. Furthermore, some steps may be performed in parallel (e.g., simultaneously) with one another.

The method 500b begins by generating a converged forwarding table (e.g., forwarding table 300) for a rail-optimized network (step 504). For example, a plurality of communication nodes may be connected to a network device via one or more ports of the network device. Furthermore, each port may be associated with a rail of a plurality of rails. Although four rails 251-254 are illustrated in FIG. 2, each network device may include fewer or more rails. Additionally, or alternatively, the number of rails on each network device in a system may not be the same.

The method 500b may continue by receiving a packet for forwarding (step 508). The method 500b may further include applying a filter to the converged forwarding table (e.g., forwarding table 300) based on the rail a received packet is associated with (step 512). In some embodiments, the converged forwarding table may be maintained in memory at the switch 104. The filter masks egress ports that belong to a different rail than the rail associated with the ingress port. The method 500b may further include selecting an egress port for forwarding (step 516). For multicast transmission, multiple or all "visible" egress ports are selected. For example, a packet may be received at port 1 of the switch 104/204 and port 1 belongs to rail 3. The filter masks all egress ports not associated with rail 3 and the packet is multicast on the remaining egress ports (step 520b). In some embodiments, all remaining ports are selected, in embodiments, multiple (but not all) of the remaining ports are selected.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A network device, comprising:
a plurality of ports including ingress and egress ports for routing traffic;
a forwarding table that includes entries which map each port to a rail of a plurality of rails; and
one or more circuits to apply a filter associated with a first ingress port to the forwarding table, wherein the filter masks egress ports in the forwarding table that are mapped to rails other than a rail mapped to the first ingress port.

2. The network device of claim 1, wherein the filter comprises a static mask.

3. The network device of claim 1, wherein the filter is configured according to port rail assignments.

4. The network device of claim 1, wherein the one or more circuits are to:
receive, via the first ingress port, a packet for forwarding;
apply the filter associated with the first ingress port to the forwarding table;
select, based on applying the filter, an egress port for forwarding the received packet; and
forward the received packet via the selected egress port.

5. The network device of claim 1, wherein the first ingress port and at least one other ingress port are mapped to the rail.

6. The network device of claim 1, wherein each ingress port in the plurality of ports has an associated filter.

7. The network device of claim 1, wherein the plurality of ports are implemented as a leaf switch or a spine switch.

8. The network device of claim 4, wherein the selected egress port comprises multiple egress ports to enable multicast transmission of the packet.

9. The network device of claim 1, wherein the forwarding table maps each rail to multiple egress ports in the plurality of ports.

10. A system, comprising:
a plurality of ports including ingress and egress ports for routing traffic;
a forwarding table that includes entries which map each port to a rail of a plurality of rails; and
one or more circuits to apply a filter associated with a first ingress port is to the forwarding table, wherein the filter masks egress ports in the forwarding table that are mapped to rails other than a rail mapped to the first ingress port.

11. The system of claim 10, wherein the filter comprises a static mask-of egress ports to the ingress port.

12. The system of claim 10, wherein the filter is configured according to port rail assignments.

13. The system of claim 10, wherein the plurality of rails comprises at least four rails.

14. The system of claim 10, wherein the first ingress port and at least one other ingress port are mapped to the rail.

15. The system of claim 10, wherein each ingress port in the plurality of ports has an associated filter.

16. The system of claim 10, further comprising a leaf switch.

17. The system of claim 10, further comprising a spine switch.

18. A method for routing data traffic, comprising:
receiving, via a first ingress port, a packet for forwarding;
applying a filter associated with the first ingress port to a forwarding table that maps each port of a plurality of ports to a rail of a plurality of rails, the plurality of ports including ingress and egress ports, wherein the filter masks egress ports in the forwarding table that are mapped to rails other than a rail mapped to the first ingress port;
selecting, based on applying the filter, an egress port for forwarding the received packet; and
forwarding the received packet via the selected egress port.

19. The method of claim 18, wherein the forwarding table maps each rail to multiple egress ports in the plurality of ports.

20. The method of claim 18, wherein the selected egress port comprises multiple egress ports to enable multicast transmission of the packet.

* * * * *